United States Patent [19]
Berkoff

[11] Patent Number: 5,387,781
[45] Date of Patent: Feb. 7, 1995

[54] VENTED FOOD COOKING SYSTEM FOR MICROWAVE OVENS

[76] Inventor: William Berkoff, 6143 W. Olympic Blvd., Los Angeles, Calif. 90043

[21] Appl. No.: 146,784

[22] Filed: Nov. 2, 1993

Related U.S. Application Data

[63] Continuation-in-part of Ser. No. 973,186, Nov. 9, 1992.

[51] Int. Cl.6 ............................................. H05B 6/80
[52] U.S. Cl. .................................. 219/735; 219/733; 99/DIG. 14; 426/118
[58] Field of Search ............... 219/10.55 E, 735, 734, 219/732, 733, 731; 426/118, 243; 99/DIG. 14, 410

[56] References Cited

U.S. PATENT DOCUMENTS

| | | | |
|---|---|---|---|
| 4,317,017 | 2/1982 | Bowen | 219/734 |
| 4,486,640 | 12/1984 | Bowen et al. | 219/735 |
| 4,499,356 | 2/1985 | Hatagawa | 219/735 |
| 4,532,397 | 7/1985 | McClelland | 219/735 |
| 4,705,927 | 11/1987 | Levendusry et al. | 219/732 |
| 4,880,951 | 11/1989 | Levinson | 219/734 |
| 4,882,463 | 11/1989 | Kyougoku et al. | 219/735 |
| 5,028,754 | 7/1991 | Chiba | 219/735 |
| 5,097,107 | 3/1992 | Watkins et al. | 219/732 |

*Primary Examiner*—Philip H. Leung
*Attorney, Agent, or Firm*—Erik M. Arnhem

[57] ABSTRACT

Foods can be cooked, baked or roasted in a microwave oven by enclosing a food-containment dish in a hood. Vent openings in the end wall of the hood permit a controlled escape of steam from the space enclosed by the hood; air heated within the hood provides an updraft condition that induces a flow of steam through the vent openings. Air holes in the hood side wall permit replacement air to flow into the hood to replace air that escapes with the steam. The apparatus achieves a relatively even heating of the food, and a controlled venting of steam from the food throughout the food-cooking process.

4 Claims, 3 Drawing Sheets

VENTED FOOD COOKING SYSTEM FOR MICROWAVE OVENS

CROSS REFERENCE TO RELATED PATENT APPLICATION

This is a continuation-in-part of my copending patent application Ser. No. 973,186 filed Nov. 9, 1992.

FIELD OF THE INVENTION

This relates to a microwave food-cooking apparatus usable in conventional microwave ovens for improving the appearance and taste of foods cooked in such ovens. Essentially, the apparatus comprises various parts, such as a ventable hood, and various vented and fitted lids that can be placed over vented and non-vented cooking dishes, as required to provide a heat-retaining and air-circulating chamber around food while being microwave cooked, baked or roasted.

BACKGROUND OF THE INVENTION

In terms of apparatus parts, various members of this vented microwave cooking system create an auxiliary heating oven within the cavity of the microwave oven, whereby foods tend to cook more rapidly and more completely, thus improving microwave cooking to a practical art. For example, food cooked in microwave ovens under conventional conditions often tend to cook unevenly having an excess deficiency of moisture, irrespective whether cooked in a covered or uncovered dish. In general, the finished food product usually appears unappetizing and the taste factor is usually diminished. Further, moisture in food under present microwave conditions does not dissipate efficiently. As an example, vegetables end up being soggy, wrinkled and unappealing. Furthermore, under conventional microwaveable conditions, meats, fish and fowl do not cook evenly nor brown, primarily due to uneven distribution of heat to the food. In this context, a food cooking apparatus of the present invention will eliminate the above mentioned shortcomings, now prevailing.

SUMMARY OF THE INVENTION

The present invention relates to a food apparatus that can be placed in a conventional microwave oven to ensure a more appealing and more appetizing cooked food product. Further the apparatus of the invention can be used for cooking a broad variety of microwavable foods, e.g. vegetables: Particularly carrots, potatoes, beans, asparagus and peas; also meats, such as hamburgers, chickens and roasts; stews; also fish and seafood, also baking of cakes and bread, plus various styles of eggs, and prepared food dishes such as pizza and TV Dinners.

In its preferred form the, invention comprises a unique ventable hood adapted for placement over or around various food cooking dishes in a microwave oven. Accordingly various dishes offer a smaller plan dimension than the primary vented hood so that an annular confined space is formed around the dish. Also, the hood has an upper end wall (or roof) having a large number of vent openings, and an annular side wall having a number of circumferentially spaced air holes.

When the food and the dish is bombarded with microwaves, the dish is heated due to its contact with the outer layer (or mass) of food. Heat is thereby radiated into the annular confined space surrounding the dish. The heated confined air creates an updraft through the vent openings in the upper wall of the hood of the steam, and also due to the updraft created by the confined mass of heated air surrounding the dish. The air holes in the annular side wall of the hood replenish the heated air surrounding the food-containment dish so that the updraft action is ongoing throughout the course of the food-heating operation.

The mass of confined heated air surrounding the food-containment dish is further advantageous in that the dish side wall is maintained in a heated condition. Heat generated in the outer annular mass of food in contact with the dish side wall is forced to flow radially inwardly toward the central axis of the dish, rather than radially outwardly away from the dish central axis. As a result, the food tends to cook more evenly, also more quickly. In principle the intense heat emitted is circulating, never trapped.

The hood preferably has a frusto-conical configuration, with the upper edge of the hood annular side wall having a smaller diameter than the lower edge; the hood is thus convergent in the upper direction. Near the lower annular edge of the hood there is provided an external annular baffle that forms an upwardly-open channel on the external surface of the hood side wall; the aforementioned air holes communicate with the channel.

During the food-cooking operation some of the steam flowing upwardly through the vent openings in the hood end wall cools slightly after it has passed through the vent openings. The somewhat cooled (but still relatively hot) moist air at the upper end of the hood gravitates downwardly along the outer surface of the hood side wall so as to heat the side wall (or prevent the side wall from being excessively cooled). The externally heated hood side wall keeps the space within the hood from being cooled excessively, such that the steam-venting process is maintained.

The heated moist air flows downwardly along the external surface of the hood side wall so as to eventually collect in the external channel at the lower end of the hood. The moist air then flows back into the hood through the air holes that are in communication with the annular channel. Thus, the hood is designed to achieve a recirculation of air into the hood for promoting the continuous ongoing venting of steam, and the resupply of air to the confined annular space surrounding the food-containment dish.

During the cake (or bread) cooking process oven air is recirculated into the heating chamber occuppied by the baking pan via the air holes in the hood-side wall. However, due to the inverted nature of the hood, the recirculating air will be relatively dry when it first enters the heating chamber through the air holes in the hood side wall. The total steam venting action through the port openings in the cover may thus be relatively more complete, such that the cake or bread dough is baked, rather than being partially steamed (as in the case of vegetables and some other foods).

The hood may also be used for roasting edible nuts and seeds. In such an operation the hood is placed in an inverted position, with its end wall seated on the floor of the microwave oven, and with its open end facing upwardly; a cover, having a multiplicity of port openings, is placed on the open end of the hood to form a roasting chamber. The nuts or seeds are distributed on the hood end wall for bombardment by the microwaves.

During the roasting operation air is admitted to the hood via the air holes in the hood side wall. Heat generated by the roasting operation raises the air temperature within the hood, thereby producing an updraft condition. The updraft tends to cool the outer surfaces of the nuts or seeds, such that the core areas of the nuts or seeds tend to reach essentially the same temperature as the outer surface areas of the nuts or seeds. The nuts or seeds are thus heated (roasted) more evenly and completely so as to have an enhanced crispness and optimum aroma.

The apparatus of the present invention can be used in a microwave oven for cooking, baking or roasting a range of different foods, e.g. nuts, seeds, bread, vegetables, meats, and fish

THE DRAWINGS

DESCRIPTION OF A PREFERRED EMBODIMENT OF THE INVENTION

Figure 1:
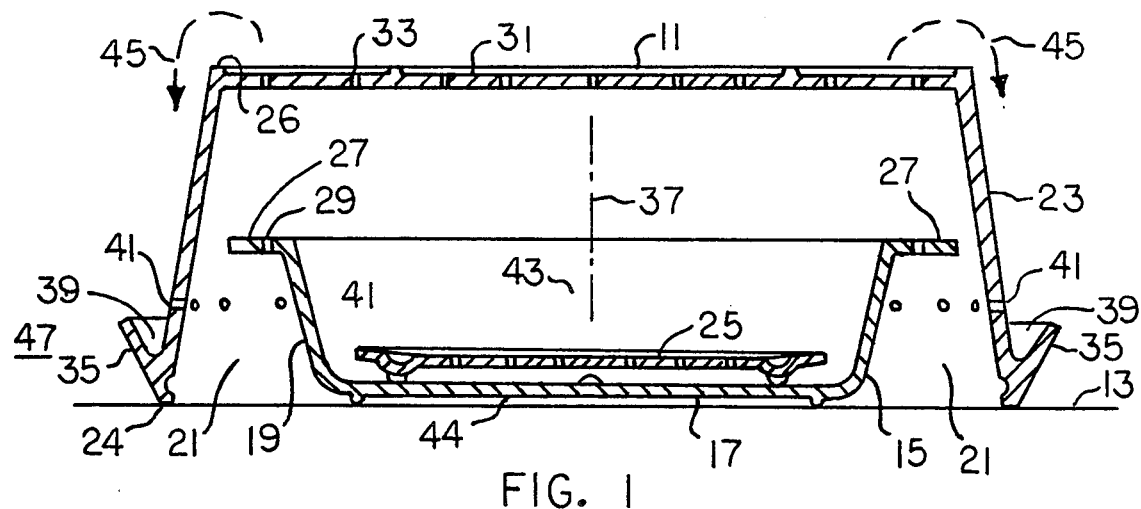
FIG. 1 is a sectional view taken through a food-cooking apparatus constructed according to the invention.
Figure 2:
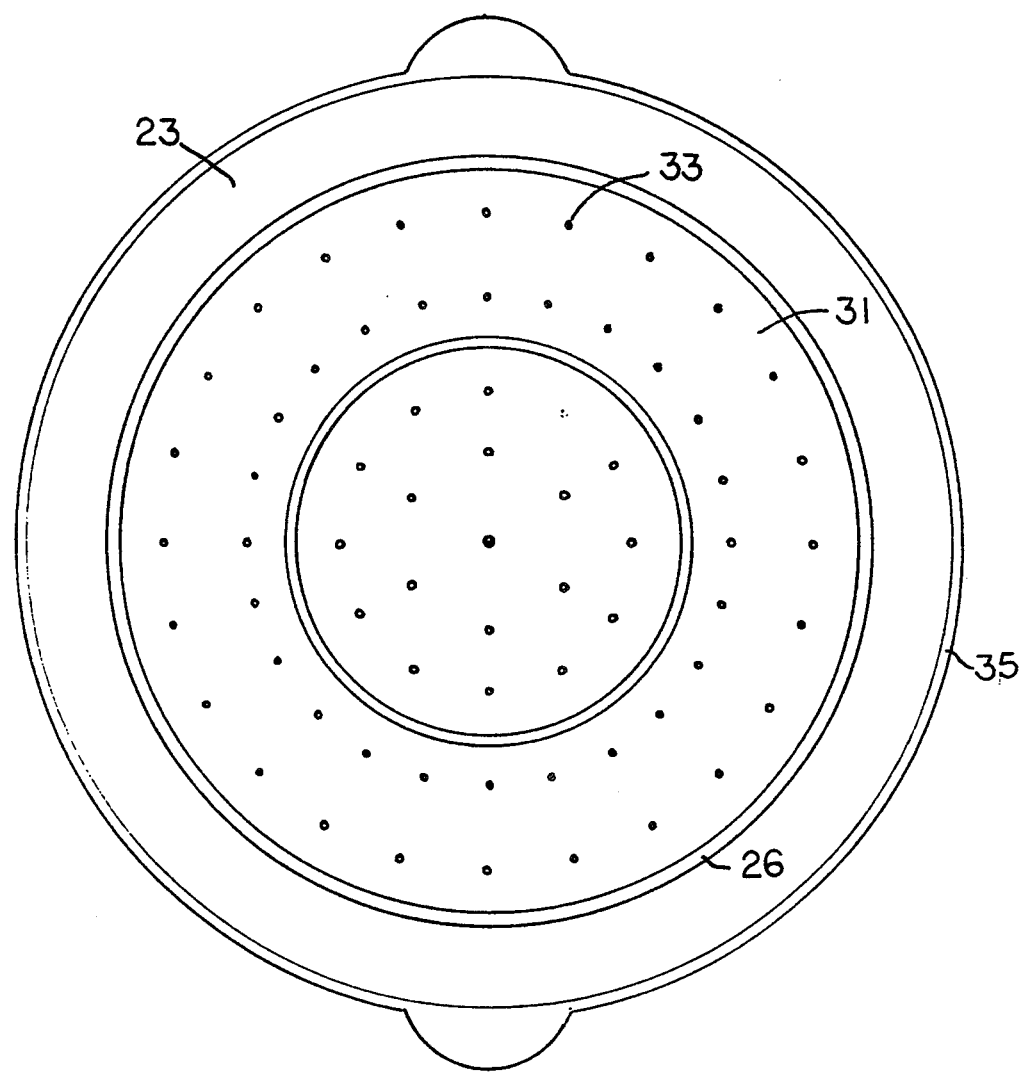
FIG. 2 is a top plan view of the FIG. 1 apparatus.

FIGS. 1 and 2 show a food cooking apparatus that comprises a frusto-conical hood 11 adapted to rest on a support surface 13. In practice the hood will be utilized in a conventional microwave oven, not shown. Support surface 13 will be the floor of the microwave oven. As seen in plan view in FIG. 2 the hood has a circular configuration.

Disposed within hood 11 is a food-containment dish 15 that comprises a bottom wall 17 and an upstanding side wall 19. The dish has a circular configuration in the top plan view, whereby there is formed an annular space 21 between the dish side wall 19 and the surrounding side wall 23 of the hood. Foods of various kinds may be placed within dish 15 for cooking purposes; e.g. vegetables, pieces of chicken, or cereal. In the cases of meat and vegetables, the food can be supported on a platform 25 having short legs for spacing the platform a short distance above the dish bottom wall; perforations (openings) in the platform enable water, juices and other liquids to drain from the support food item into dish 15.

Dish 15 can be of various heights, e.g. ranging from about one inch to about three inch; typically the dish will be about two inch deep. The dish diameter will be about seven and one half inches. At its upper edge the dish has an outwardly radiating annular flange 27. The flange forms a handle that facilitates placement of the dish in the microwave oven. Additionally, the flange partially closes the space between the dish outer edge and the hood side wall 23, whereby the flange tends to retain the air in annular space 21 in a heated condition; flange 27 acts as a head-retention device. A series of port openings 29 can be formed in the flange to facilitate a limited flow of heated air upwardly through the flange. A somewhat greater flow of heated air can occur around the outer edge of flange 27.

Referring to hood 11, the hood side wall 23 has a lower annular end edge 24. An end wall 31 extends across the upper end edge 26 to form a roof for the hood. A large multiplicity of steam vent openings 33 is formed through end wall 31; each vent opening can be a circular hole having a diameter of about three sixteenth inch. Hood 11 can have a diameter of about ten inches, measured across the lower end edge 24. The axial height of the hood can be about four and one quarter inch.

As previously noted, hood side wall 23 has a frusto-conical configuration, whereby the hood is slightly convergent in the upward direction. The cone angle of wall 23 (relative to a vertical axis) may be about ten degrees. Within the broader aspects of the invention, the hood side wall could be cylindrical. The frusto-conical configuration represents the preferred construction.

Near its lower end edge 24, the hood side wall 23 carries an outwardly extending annular baffle wall 35. Wall 35 extends upwardly and outwardly away from the hood central axis 37 so as to form a V-shaped channel (or trough) 39. A series of circumferentially spaced air holes 41 is formed in hood side wall 23 a slight distance above the bottom surface of channel 39. Air can flow into the hood through the various holes 41.

After the hood has been placed over dish 15 (containing food to be cooked) in a microwave oven, the oven can be turned on to bombard the food in dish 15 with microwaves. The hood 11, dish 15, and platform 25 are each formed of a material transparent to microwaves, e.g. ceramic or glass, such that the food is heated without at the same time directly heating dish 15. However, the heated food in contact with the dish side wall 19 will heat wall 19 by conduction and radiation, such that the annular confined air space 21 will be heated to a certain extent. Hood side wall 23 will confine the air in space 21, thereby promoting a localized heating of the air in space 21.

The microwave heating process proceeds from the outer layers of food in dish 15 to the inner core food zone 43; as the microwaves penetrate the food in dish 15 they decrease somewhat in intensity, such that the core (inner) food zone 43 is normally heated to a lesser extent than the outer food layers on the food upper surface, along the dish bottom wall 17, and along the dish side wall 19. The arrangement of dish 15 within hood 11 is such that heat radiating from the dish side and bottom walls is trapped in annular space 21 and space 44 below the dish bottome wall. The trapped heat forms a barrier to radiation of heat away from zone 43. Heat tends to travel from the outer layers of food in the dish toward core zone 43. As a result, the food tends to cook more evenly and more quickly. The advantageous condition is due to the presence of hood 11 around dish 15.

During the microwave heating process steam is generated in the confined space above dish 15. The heated vapor tends to rise so as to exit from the hood via vent openings 33 in hood end wall 31. At the same time the heated air in annular space 21 tends to flow upwardly around flange 27 of dish 15, thus creating an updraft condition that assists (induces) steam flow through vent openings 33.

Some of the steam exiting through vent openings 33 is cooled and caused to flow downwardly along the outer surface of hood side wall 23, as indicated by arrows 45 in FIG. 1. The downwardly flowing moist air is still relatively hot so that it imparts some heat to side wall 23; the side wall is thereby prevented from being cooled excessively. As a result, the hood side wall remains sufficiently hot as to prevent condensation of steam within the enclosed space 47 above dish 15. The frustoconical configuration of hood side wall 23 is helpful in that the sloped side wall and thus heat the wall.

As the external heated moist air reaches channel 39 some of the water content may be in a condensed stage. Condensate will collect in the channel, while at least some of the air will flow through air holes 41 back into hood 11 to replenish the air that has moved upwardly from annular space 21 to produce the aforementioned updraft condition. The hood construction is designed to produce a circulation of air into the hood, via holes 41, and an outflow of steam-laden air from the hood, via vent openings 33. Some of the steam condensate is collected in annular channel 39.

Baffle 35 forms channel 39, as well as providing a baffle action that prevents relatively cool air in zone 47 from reaching air holes 41. The air flowing through holes 41 is heated air, such that the air temperature in space 21 is maintained at a satisfactorily high temperature.

The hood construction depicted in FIGS. 1 and 2 improves the microwave heating process in that it promotes the venting of steam from the food being cooked in dish 15. Once the steam has exited through vent openings 33 the hood prevents the steam from gravitationally returning to dish 15; end wall 31 of the hood acts as a check valve. The hood construction also improves the food cooking process in that it produces the confined heated air space 21 around dish 15, such that the heated outer layer of food along dish side wall 19 forces a flow of heat into core zone 43, thereby producing a more even heating action.

Figure 3:
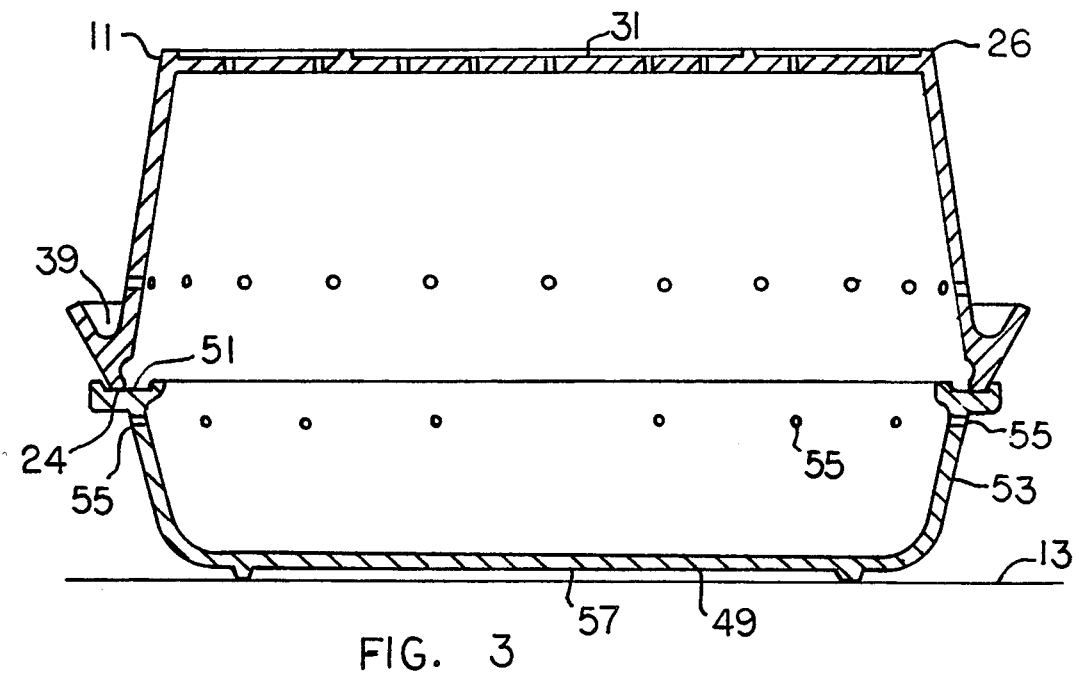
FIG. 3 is a sectional view taken in the same direction as FIG. 1, but showing a hood structure positioned on a food-containment bowl (dish) for cooking relatively large quantities of food.

The hood construction of FIGS. 1 and 2 can be positioned atop a larger food-containment dish 49, as shown in FIG. 3. The arrangement of FIG. 3 is used when it is necessary to cook quantities of food greater than the capacity of dish 15 (FIG. 1).

As shown in FIG. 3, dish 49 has an annular ledge 51 at the upper edge of the dish side wall 53. Hood 11 is arranged with its end edge 24 resting on the ledge, whereby the hood and dish 49 cooperatively form a single vented food cooking chamber. Circumferentially spaced air openings 55 are formed in wall 53 a slight distance below ledge 51 (remote from bottom wall 57 of the dish). The dish is formed of a material that is transparent to microwaves.

During the microwaves heating process air can flow into the heating chamber through air holes 41 and 55. Steam is vented from the chamber through vent openings 33 in hood end wall 31. Some of the steam-laden air is recirculated downwardly along the outer surface of the hood side wall, as indicated by arrows 45. Channel 39 serves as a condensate collection device.

Figure 4:
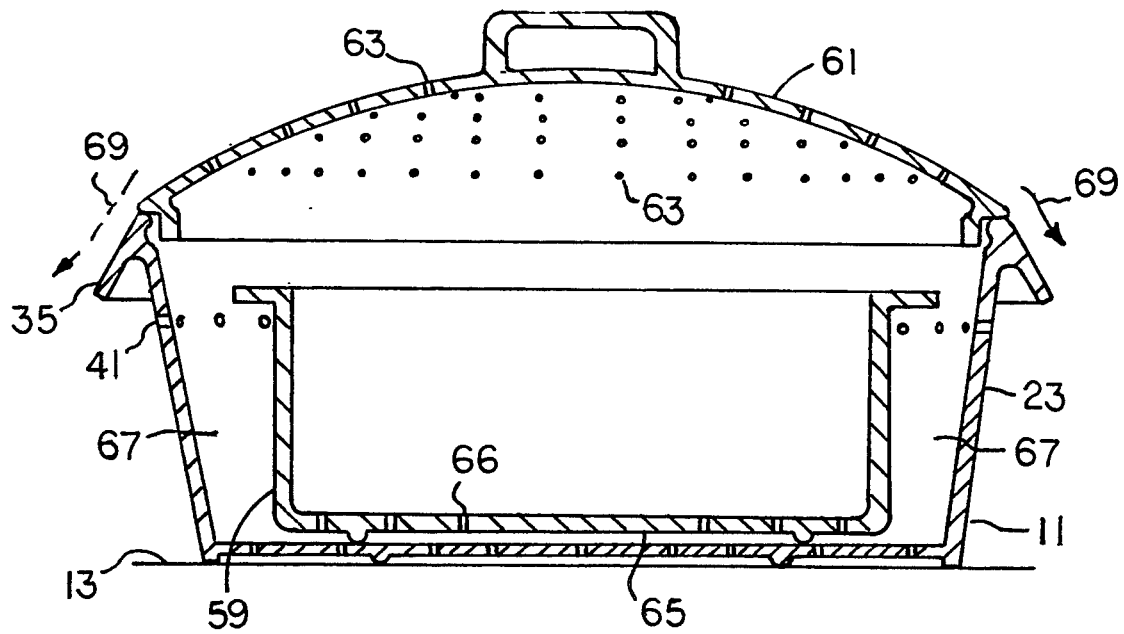
FIG. 4 is a sectional view taken in the same direction as FIG. 1, but showing the hood structure inverted to form an upwardly-open chamber for a pan used to bake a cake or bread; the chamber is closed by a removable cover having a large multiplicity of port openings for venting steam generated during the baking process.

FIG. 4 shows hood 11 upright for containment of a circular pan 59 used to bake bread or cakes hood 11 functions as an end edge for pan 59. End edge 26 of the hood rests on the floor surface 13 of the microwave oven, while end edge 24 of the hood faces upwardly to support a circular cover 61. Edge 24 constitutes the upper edge of enclosure 11 in the FIG. 4 configuration. The cover has a large multiplicity of port openings 63 for venting steam from the cooking chamber cooperatively formed by the hood (enclosure) and cover. Cover 61 and pan 59 are formed of a material that transmits microwaves, e.g. glass or ceramic.

Pan 59 has an annular flange 60 that forms a handle facilitating movement of the pan into or out of the microwave oven. Flange 60 also acts to confine heat in annular space 67 aurrounding the pan. The height of pan 59 is such that air holes 41 in hood 11 are slightly below the plane of flange 60.

The bottom wall 65 of pan 59 has vent openings 66 for venting steam from the dough being baked in the pan. The diameter of pan 59 is less than the diameter of hood 11, such that a confined annular space 67 acts as a heat retention space, to promote an even heating (baking) of the cake or bread in pan 59. Space 67 serves the same function as annular space 21 in the FIG. 1 arrangement.

During the baking operation air in confined space 67 acts as a heat heated to produce an updraft for assisting the escape of steam through the vent openings 63 in cover 61. Moist heated air can flow downwardly along the outer surface of baffle wall 35, as indicated by arrows 69, so as to be dissipated within the oven away from the hood side wall 19. Air that is recirculated into the hood via air holes 41 tends to be relatively cool and dry. consequently the steam venting action tends to be somewhat more extensive and complete, when compared with the action produced by the arrangement of FIG. 1.

Figure 5:
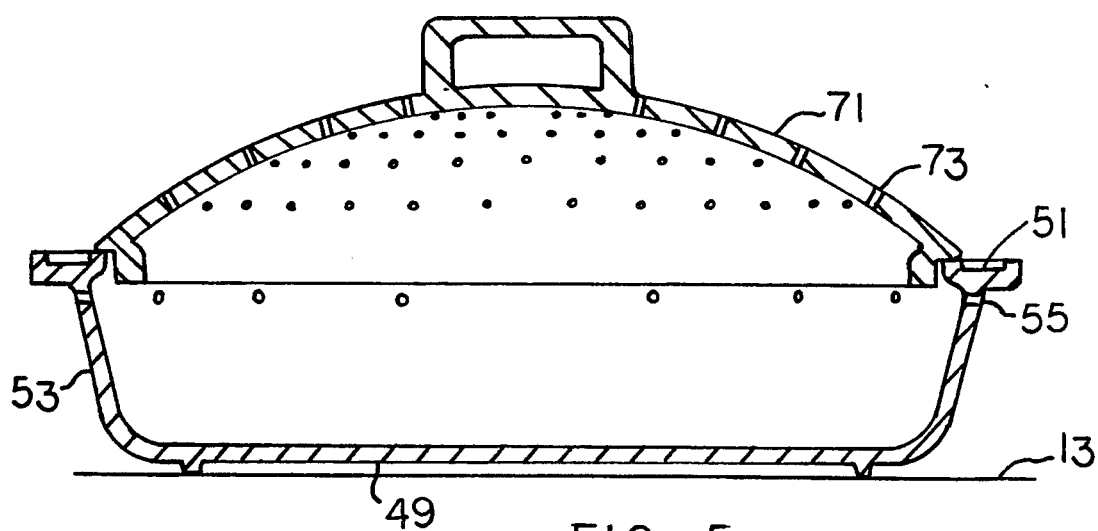
FIG. 5 is a sectional view taken through a baking dish and cover embodying features of the invention.

FIG. 5 shows a vented cooking arrangement wherein the food-containment dish 49 of FIG. 3 is used with a vented cover 71 to form a single closed heating chamber; vent openings 73 in the cover serve to vent steam from the cooking chamber. Moist heated air emitted through openings 73 can flow downwardly around the outer edge of annular ledge 51, such that some condensate can be deposited in the trough formed by the ledge. Air holes 55 in the side wall of dish 49 serve to recirculate air back into the heating chamber. The heating apparatus of FIG. 5 can be used to cook various different foods, e.g. hamburgers, fish vegetables, and eggs.

Figure 6:
FIG. 6 is a sectional view taken through an egg-containment cup that can be used in the baking dish of FIG. 5.

FIG. 6 shows a circular cup 75 that is usable in dish 49 (FIG. 5) for containment of a raw egg that is to be poached by a microwave heating action. Dish 49 has sufficient capacity to hold three or four egg cups of the type shown in FIG. 6. Each egg cup is formed of a material transparent to microwaves.

Figure 7:
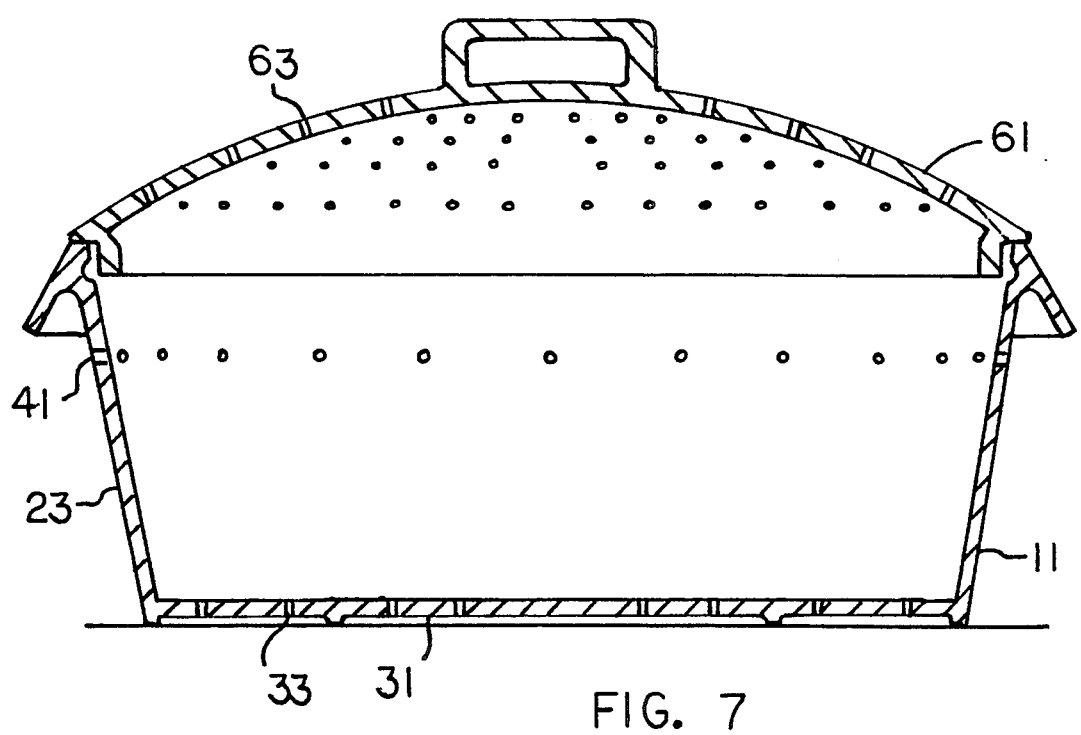
FIG. 7 is a sectional view taken through a hood structure, used in conjunction with a vented cover, for roasting nuts or seeds, in accordance with the invention.

FIG. 7 shows the previously described hood 11 for the purpose of roasting edible seeds or nuts in a microwave oven. The previously described cover 61 (FIG. 4) is used to close the upper end of the hood. The nuts or seeds to be roasted are placed on the upper face of hood end wall 31 (i.e. wall 31 forms the floor of the roasting chamber). If the seeds are smaller than the size of openings 33 in wall 31 it will be necessary to provide a sheet of filter paper on wall 31 to form a seed support surface. Openings 33 are preferably circular holes having a diameter of about three sixteenth inch; most edible seeds are larger than this dimension.

During a microwave roasting operation air in contact with the seeds or nuts is heated so as to raise the general air temperature within the heating chamber. Some of the heated air is vented from the chamber through vent openings 63 in cover 61. Replacement air is admitted to the heating chamber through air holes 41 in the hood side wall. A slight air updraft condition is produced in the heating chamber, such that the outer surface areas of the seeds or nuts are cooled. The cooling action tends to equalize the temperature with the nuts or seeds, such that the core areas of the nuts or seeds are heated to approximately the same extent as the surface areas. Aromtic oils and vapors are thereby released from the nuts or seeds to enhance the taste of the roasted nuts or seeds.

The principal aim of the invention is to provide a food-cooking apparatus having an improved vapor-venting action and a more even cooking action. The food to be cooked is located within a closed heatable chamber having a large multiplicity of vent openings in the roof of the chamber. Recirculation air is admitted to the heating chamber through air openings in the side wall of the chamber. In preferred practice of the invention the heating chamber is provided by a frusto-conical hood placed over or around a food-containment dish. Various types of food can be cooked, baked or roasted in the cooking apparatus.

What is claimed is:

1. A food cooking system comprising an enclosure having an annular upstanding side wall positionable in a microwave oven, said side wall having an upper annular edge; an open-topped food-containment pan smaller than said enclosure, whereby said pan is positionable within the enclosure in a microwave opening; a rigid cover mounted on the upper edge of the enclosure side wall to form a central confined space above the pan; said pan having a bottom wall and a side wall, said pan side wall having an upper annular edge spaced below the plane of the enclosure side wall upper edge; a number of circumferentially spaced air holes in the enclosure side wall for supplying air to said heatable air chamber, said air holes being located a slight distance below the upper edge of the pan side wall; said cover having a multiplicity of vent openings therein for venting steam from the food being cooked in the pan; said pan side wall being spaced from the enclosure side wall to form an annular heatable air chamber between the enclosure side wall and the pan side wall, said air holes being in direct communication with said annular heatable chamber; said air holes being effective to replenish air in in the annular heatable chamber, whereby a continual updraft of heated air is maintained from the annular chamber into the central space above the pan, so that the updrafted air promotes outflow of steam through the vent openings in said cover; said enclosure, cover and food-containment pan being formed of a material transparent to microwaves.

2. The food cooking system of claim 1, and further comprising an annular baffle extending outwardly from the upper edge of the enclosure side wall to overlie said air holes, whereby said air holes are shielded from moist air flowing off the cover.

3. The food cooking system of claim 1, wherein said cover has a dome shape in which an exterior surface of the cover slopes downwardly away from the cover central vertical axis; said enclosure having an annular baffle extending outwardly from the upper edge of the enclosure side wall to overlie said air holes; said annular baffle having an upper surface that is contiguous with the cover exterior surface for shielding the air holes from moist air flowing off the cover.

4. The food cooking system of claim 1, wherein said pan has a heat-confining flange (60) extending outwardly from the pan upper edge, whereby air in said annular chamber is partially confined by said flange.

* * * * *